E. H. SNYDER.
CORN PLANTER.
APPLICATION FILED MAR. 13, 1911.

1,012,174.

Patented Dec. 19, 1911.
3 SHEETS—SHEET 2.

Witnesses:
Austin B. Hauscom
A. L. McClintock

INVENTOR—
Emmanuel H. Snyder,
By C. E. Humphrey
ATTORNEY.

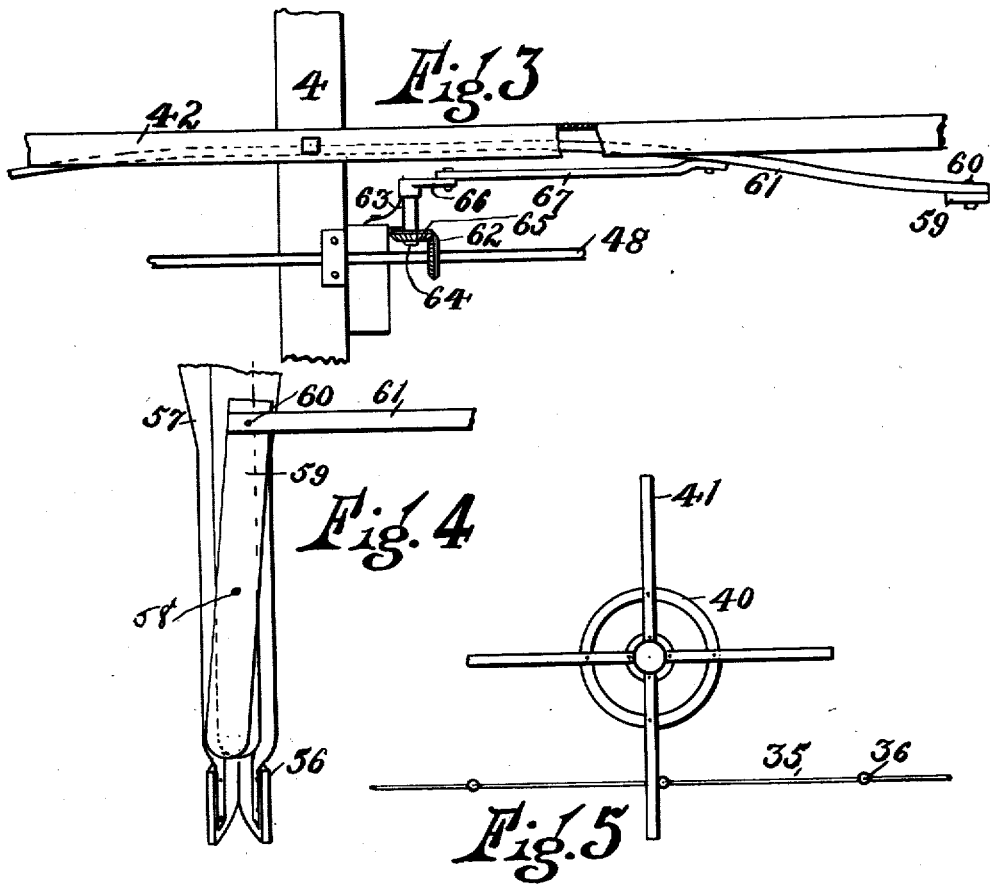

UNITED STATES PATENT OFFICE.

EMMANUELL H. SNYDER, OF BARBERTON, OHIO.

CORN-PLANTER.

1,012,174.      Specification of Letters Patent.      Patented Dec. 19, 1911.

Application filed March 13, 1911. Serial No. 614,114.

*To all whom it may concern:*

Be it known that I, EMMANUELL H. SNYDER, a citizen of the United States, residing at Barberton, in the county of Summit and State of Ohio, have invented new and useful Improvements in Corn-Planters, of which the following is a specification.

This invention relates to corn and other seed planting devices, and the object of the invention is to provide a device which will plant seeds either in continuous rows or at selected and adjusted intervals whereby those seeds which are more advantageously planted in rows may be deposited by this device and also the device is fully capable of planting seeds in hills and where the ground is checked by some instrumentality as a wire provided with spaced lugs which engage certain portions of the mechanism for intermittingly depositing the seed in the ground.

A further object of the invention is to make the device for the intermittent planting adjustable so that the hills of seeds may be accurately spaced apart and the distance between them regulated.

A further object of the invention is to provide the device with means for raising and lowering the frame which carries the furrow-openers and seed-hoppers so as to regulate the depth of the furrows and also the amount of pressure to be imposed on the covering-wheels employed to cover the furrow after the deposit of seeds.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

Figure 1:
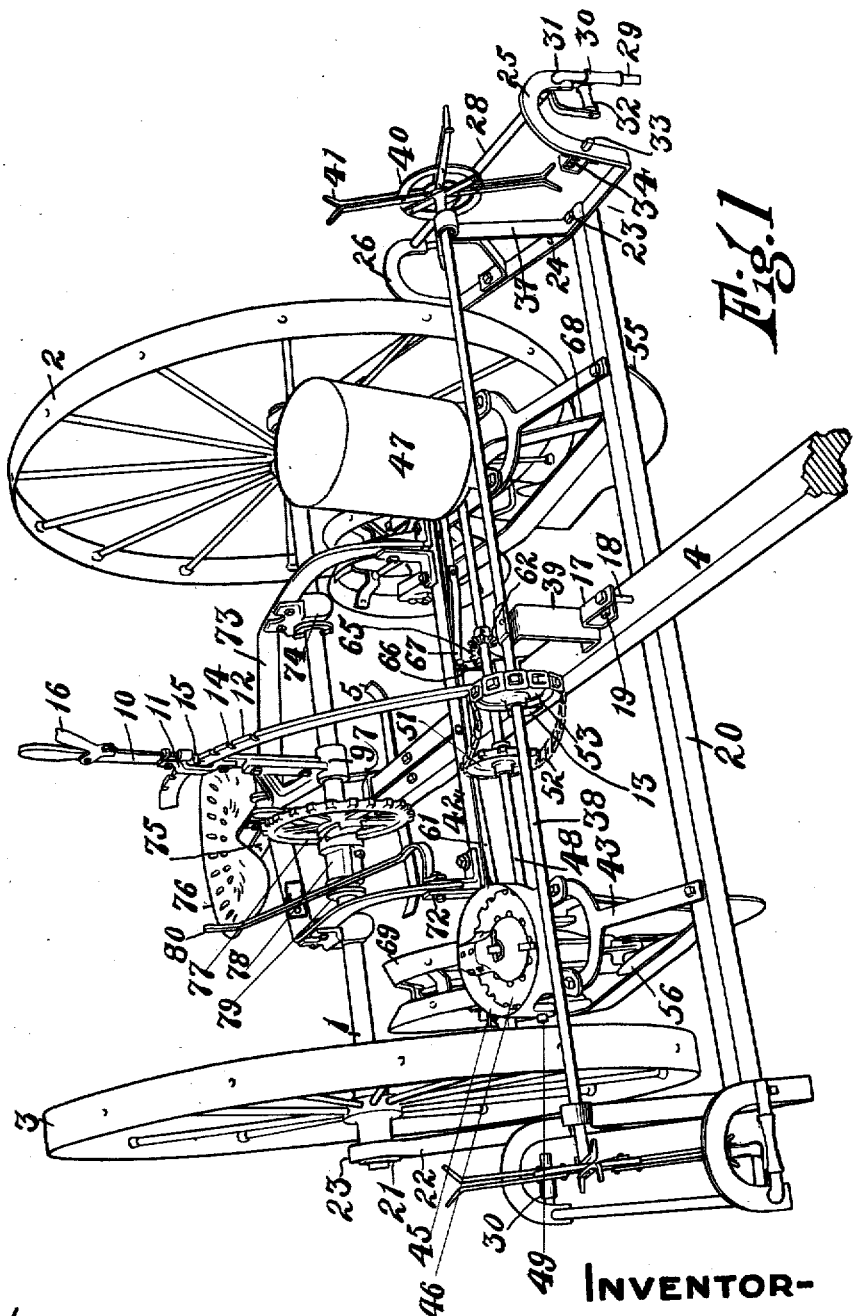
Figure 2:
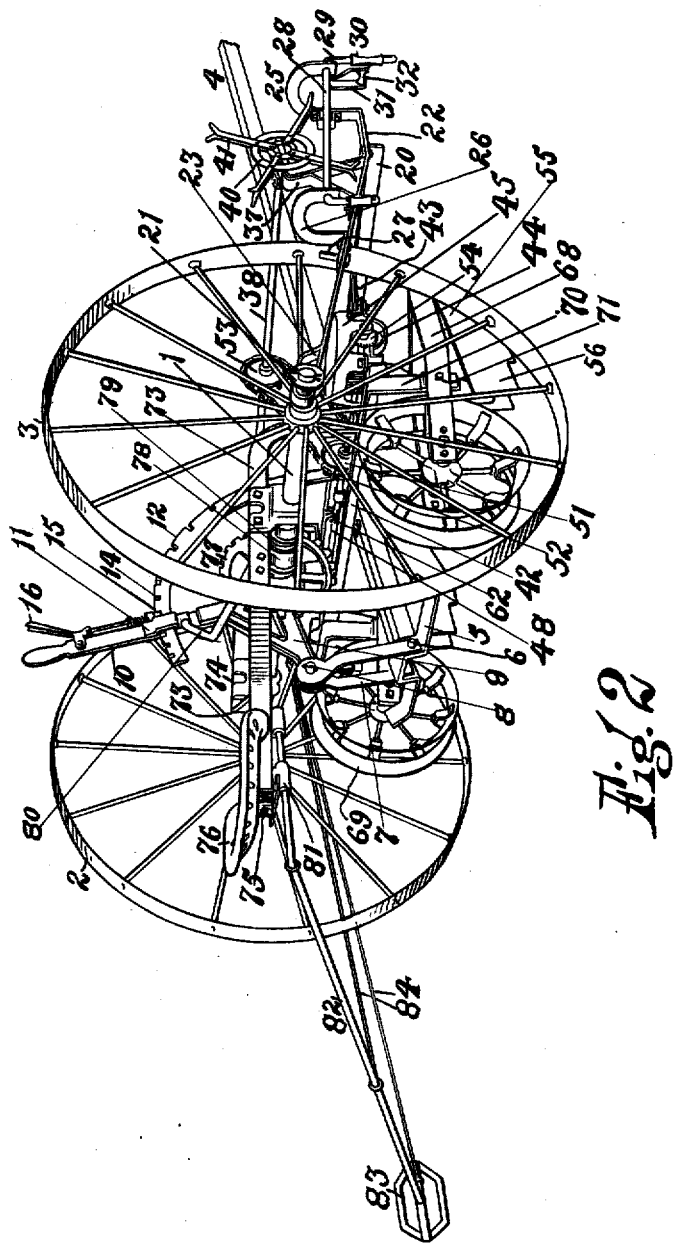

In the drawings in which similar reference numerals indicate like parts in the different figures, Figure 1, is a perspective view looking from the front of the machine; Fig. 2. is a perspective view showing the rear of the machine; and, Figs. 3, 4 and 5 are details of those portions of the machine which are not clearly shown in Figs. 1 and 2.

Referring specifically to the drawings the reference numeral 1 denotes the main axle or shaft mounted on which are ground wheels 2 and 3 positioned a short distance from the ends of the axle for a purpose to be later described. The ground wheel 2 is loosely mounted while the ground wheel 3 is tight on the axle and revolves therewith. Positioned below and approximately at right-angles with the axle 1 is a tongue 4 having at its rear end a pair of oppositely disposed stirrups 5 for the feet of the operator. These stirrups are secured to the tongue by means of a bolt 6 which also serves to pivotally hold the lower end of a pair of links 7, arranged on opposite sides of the tongue 4. The upper ends of the links 7 are provided with apertures to receive a pivoting-bolt 8. Mounted loosely on the axle 1 is a bell-crank 9, the outer end of one of the arms of which is pivotally secured between the upper ends of the links 7 by the bolt 8. Secured to the other arm of the lever of the bell-crank 9 is an operating lever 10 the upper end of which is shaped to form a hand-grasp. The lever 10 is provided with a loop 11 to receive the free end of a segmental arm 12, the opposite end of which is pivotally connected by means of a short yoke 13 to the tongue 4 at a point in advance of the shaft 1. The upper edge of the segmental arm 12 is provided with a plurality of notches 14 which are engaged by a locking-pin 15 manipulated in the ordinary manner by a hand-grasp 16, so that when the locking-pin 15 is released and the lever 10 is moved rearwardly, it lowers the rear end of the tongue by means of the bell-crank 9 and the links 7, and at the same time, the releasing of the locking-pin 15 permits the segmental arm to pass through the loop 11 permitting the front end of the tongue to simultaneously sink in company with the rear end. Mounted on the forward end of the tongue is a holding member 17 the front end of which is apertured to receive a bolt 18 by which a doubletree is attached to the device. This holding member 17 is secured to the tongue 4 by means of a bolt 19, which also serves to hold a cross-arm 20 which extends transversely of the tongue and projects laterally beyond the ground wheels 2 and 3.

The arm 20 is designed to form the main support for the mechanism for "checking" or depositing seed in hills, and as the mechanism on both ends of the arm is similar a description of one is deemed to be sufficient. Mounted on the axle outside of the ground wheels and held in position by means of a collar 21 is a supporting-bar 22 having an elongated loop portion 23 which freely receives the axle 1 with the lower front portion of the bar 22 supported on the end of the cross-arm 20 and secured by means of a bolt 23'. The bar 22 is provided with other apertures 24 so it may be shifted forwardly or rearwardly as desired, this being permitted by reason of the elongated loop 23. The front end of the bar 22 is turned up abruptly and bent laterally to form an inverted U-shaped frame 25 for a purpose to be later described.

Positioned on the bar 22 and rearwardly of the cross-arm 20 is an inverted U-shaped member 26. Extending upwardly from the base portion of the U-shaped member 26 and the bar 22 is a pin 27 for a purpose to be later described. The members 25 and 26 are provided with alined apertures to constitute bearings for a longitudinally-extending revoluble rod 28, the ends of which are bent at approximately right-angles to the main portion and are provided with concave rollers 30. The rod 28 is also arranged to carry adjacent the member 25, a yoke 31, on which is mounted a concave roller 32. Mounted on the member 25 on the opposite side from that in which the rod 28 is mounted is a catch 33 held in operative position by means of a spring 34 and withdrawn by any means such as a cord or wire controlled by the operator not shown. The function of the catch 33 is to hold the rod and its connected parts in position shown in the left in Fig. 1 and when released permitting the parts to move to their operative position as shown in the right of Fig. 1. When the parts are in the position shown in the left of Fig. 1 a wire 35 provided with spaced lugs 36 may be arranged to be guided by the combined rollers 30 and 32 so that the roller 30 sustains the wire, and the roller 32 constitutes a guide to prevent lateral movement of the same for a purpose to be further more clearly pointed out.

Securely mounted on the rods 22 are a pair of upright brackets 37 at the upper ends of which are journals for holding a transversely extending revoluble shaft 38, the central portion of which is sustained by means of a bracket 39 mounted on the tongue 4. Mounted at each end of the shaft 38 is a hub 40 from which extends radially a plurality of pairs of arms 41, the members of each pair spaced from each other a distance slightly greater than the thickness of a wire employed for "checking" and with their outer ends divergent to form V-shaped guides for the wire, in passing between the members of each pair of arms, so that as the machine moves forward permitting the wire used in "checking" to pass over the rollers 30 and guided by the roller 32, it also passes between the members of each pair of arms and the lugs being wider than the space between the arms causing an intermittent and partial rotation of the shaft 38 as the arms 41 encounter each successive lug 36 on the wire 35.

Secured by suitable means to the tongue 4 and rearwardly of the cross-bar 20 is an arm 42 usually consisting of an L-shaped angle-iron with one wide face thereof uppermost. Extending from the outer ends of the cross-arm 42 are a pair of yokes 43 with the front ends thereof mounted on and secured to the cross-bar 20. Each of these yokes 43 are of course, provided with a pair of arms which are attached near the ends of the cross-bar 42 and one of the arms of each yoke is downwardly-bent to form a semi-loop portion 44. Mounted on each of the yokes 43 is a hopper-base 45 provided with a feeding-wheel 46 and mounted on the bases 45 are tanks or hoppers 47, but as the construction of the feeding device is old, it is thought that a more extended description thereof is unnecessary.

Extending across the machine and between the cross-arms 20 and 42 is a revoluble shaft 48, the ends 49 of which are supported in suitable journals in the bases 45 and centrally by means of a bracket not shown. Mounted on the shaft 48 is a sprocket 51 which receives motion from a sprocket-chain 52 driven by means of a sprocket-wheel 53 on the shaft 38. On the ends of this shaft 48 are beveled gears 54 which mesh into teeth formed in the under face of the feeding-wheel 46, for revolving the latter.

Secured to the under face of the bar 20 are a pair of furrow-openers 55 which comprise comparatively long thin blades with rear ends 56 formed divergent with V-shaped portions which constitute means for widening the furrow produced by the forward or cutting portions of the openers 55. Secured to the V-shaped portions 56 of each of the furrow-openers 55 are the lower ends of feed-spouts 57 which are approximately semi-circular in cross section with the rear portion thereof open. Secured approximately centrally of the open rear portion of each of the spouts 57 is a pivot-bolt 58 on which is mounted a transversely oscillating gate 59, the lower end of each of which is arranged when in normal or neutral position to close the end of its respective spout 57, but when oscillated from side to side they alternately leave sufficient space for seed to pass from the spout into the furrow made by the furrow-openers 55. The upper ends of the gates 59 are provided with bolts 60 which are connected together by a cross rod 61. This cross bar is oscillated transversely by the following mechanism. Mounted on the shaft 48 is a beveled gear 62, and mounted in a suitable bracket 63, secured to the tongue 4 is a shaft 64 at right-angles to shaft 48 and bearing at its forward end a beveled gear 65 which meshes with the gear 62. Mounted on the opposite end of the shaft 64 is a crank-arm 66 from which extends a connecting-rod 67 pivotally united to the cross-rod 61 so that as the shaft 48 is rotated the cross-rod 61 will be reciprocated causing alternate oscillations of the gates 59 to provide an intermittent feed from the spouts 57 into the furrows produced by the furrow-openers 55.

Secured to each of the furrow-openers 55 is a rearwardly-extending V-shaped frame 68, and between the rear divergent ends of which is revolubly mounted a covering wheel 69. These wheels are generally of the open pattern having two lateral portions preferably inclined and shaped to effectually cover and close the furrows produced by the openers 55. The frames 68 are each supported by means of an inverted U-shaped member 70 which is secured to the cross-bar 42 near the end thereof by any suitable means, as bolts, and with the downwardly-depending arms thereof passing inside of the arms of the frame 68. In order to secure vertical adjustment of each frame 68, gibs are interposed between the arms of the members 70 and the arms of the frame 68 and which are held in position by means of bolts 71, but as this device is well known, a further description is believed to be unnecessary.

Mounted on the upper face of the cross-bar 42 are a pair of separated brackets 72 each embodying a pair of upwardly-extending spaced arms. Pivotally mounted between the pairs of arms of each bracket 72 is a rearwardly-extending U-shaped frame 73 with each arm thereof provided with bearings 74 mounted on the main axle 1 for providing a support for the rear end of the frame 73. Rearwardly of the bearings 74, the frame 73 extends outwardly in an elongated loop 75 constituting a support for a driver's seat 76. The rear portion of the frame carrying the loop 76 extends rearwardly sufficiently to clear the rear end of the bell-crank 9 and permit its free vertical motion.

Loosely mounted on the main axle 1 in alinement with the sprocket-wheel 51 is a sprocket-wheel 77 having the hub thereof formed to constitute one member of a square-jawed clutch. Splined longitudinally of the axle 1 is a companion clutch-member 78 having one face thereof provided with jaws to engage the jaws on the hub of the sprocket-wheel 77, and the opposite end of the clutch-member 78 is provided with a pair of parallel integral collars 79 providing between them a groove to receiving the median portion of a clutch operating lever 80 the inner end of which is secured to one of the brackets 72. The lever 80 is preferably made of some resilient material to permit it to be swung laterally to shift the clutch member 78 into and out of engagement with the hub of the sprocket-wheel 77. The clutch member 78 being splined on the shaft 1 it will cause the sprocket-wheel 77 to revolve in unison with the axle 1. In order to drive the feeding shaft 48 directly from the main axle, the sprocket-chain 52 is removed and a longer sprocket-chain employed to extend from the sprocket-wheel 77 to the sprocket-wheel 51 which causes the axle 1 to drive the seed driving device directly without employing the checking mechanism.

Secured to the looped portion 75 of the frame 73 are a pair of alined bearings 81 depending directly under the driver's seat and in these is placed the shorter end of a long L-shaped rod 82 which has on its outer free end a marking tool 83 designed to produce a continuous mark in the soil parallel with the direction taken by the machine in its movement across the field and at a considerable and determined distance therefrom. In order to securely sustain the outer end of the arm 82 and hold it firmly and yet vertically adjustable, I employ a two-arm brace 84, the forward end of which is provided with a loop which is connected to the pin 27 which serves to hold the end of the marker from dragging rearwardly and bending or distorting the rod 82.

As already mentioned, this device is capable of planting seed intermittingly in hills or it may be used for planting the seed in rows. Assuming that it is desired to plant a field with seed in hills or "checking" it as it is technically called; a wire having lugs thereon at the intervals where it is desired to cross rows or hills is stretched firmly and tightly across the field. The device is then placed at one end of the wire with the wire passing over the rollers 30 and against the roller 32, on one side of the device, the wire is passed through the space between the pairs of arms 41 and as the machine moves forward the arms 41 encountering the lugs give a partial rotation to the shaft 38; it, in turn, rotates the shaft 48 and operates the feeding mechanism as has been already described. During this operation the marker 83 may be employed, if desired in marking the line for the next furrow.

If it is desired, on the contrary, to operate the device without the use of an actuating wire, the sprocket-wheel 52 is removed and another sprocket-chain placed over the sprocket-wheels 51 and 77 and the clutch member 78 thrown into clutching engagement with the hub of the sprocket-wheel 77 which causes the feeding mechanism to be operated continuously direct from the main axle 1.

I claim:

1. A seed planter embodying a main axle and a pair of ground-wheels therefor, a frame supported by said axle, a furrow opener carried by said frame, a feeding device mounted to deliver seed in the rear of said furrow opener, a tongue carried by said frame, a transverse bar mounted on said tongue in front of said ground-wheels, supporting bars extending from the ends of said transverse bar rearwardly, the ends of which are provided with looped portions to receive said axle, a pair of brackets mounted on said supporting bars the upper ends of which constitute bearings, a revoluble shaft mounted in said bearings, means connecting said shaft with the said feeding device, a "check-wheel" mounted on one end of said shaft, said "check-wheel" comprising pairs of spaced arms radiating from a common hub and adapted to be engaged by lugs on a "check-wire" and be thereby intermittingly partially rotated, an inverted U-shaped member in front of said "check-wheel" and a second U-shaped member positioned rearwardly of said "check-wheel," said members being in longitudinal alinement, a shaft carried by said U-shaped members with the ends thereof bent at angles to the major portion thereof, rollers mounted on the bent portions of said shaft, a second roller carried by said shaft adapted to be arranged approximately vertically when said rollers are in their operative position, and a spring catch mounted on one of said U-shaped members for holding said rollers in operative position to guide a "check-wire" to the spaces between the members of the pairs of arms of said "check-wheel."

2. A seed planter embodying a main axle and a pair of ground-wheels therefor, a frame, supported by said axle, a furrow opener carried by said frame, a feeding device mounted to deliver seed in the rear of said furrow opener, a tongue carried by said frame, a transversely-extending bar supported by said tongue in advance of said ground-wheels, supporting bars secured to the ends of said transverse bar and having elongated looped rear portions to receive the ends of said main axle outside of ground-wheels, means for holding said looped portions on said axle, suitably supported bearings on said supporting bars, a rotatable shaft in said bearings, means connecting said shaft with the said feeding mechanism, a "check-wheel" on the end of said shaft, guiding means on said supporting bars adapted to guide a "check-wire" to said "check-wheel" whereby said shaft will be intermittingly partially rotated to cause a simultaneous movement of said seed feeding device and means for temporarily holding said "check-wire" guiding means in its operative position.

3. A seed planter embodying a main axle and a pair of ground-wheels therefor, a frame supported by said axle, a furrow opener carried by said frame, a feeding device mounted to deliver seed in the rear of said furrow-opener, a tongue carried by said frame, a transversely-extending bar secured to said tongue in advance of said ground-wheels, a supporting bar extending from the one end of said transverse bar rearwardly and provided with a looped portion to receive the end of said main axle outside of said ground-wheels, suitably supported bearings mounted on said supporting bars, a rotatable shaft in said bearings, means connecting said shaft with said seed feeding device whereby the latter is operated in unison with the partial rotations of said shaft, a "check-wheel" on the ends of said shaft, said "check-wheel" embodying a hub provided with a plurality of pairs of arms radiating from said hub, the members of each pair being spaced from each other to receive and be partially rotated by the lugs on a "check-wire", pivotally mounted guiding means for said "check-wire", rollers on said guiding means, said guiding means capable of being swung into position to guide said wire and to be moved therefrom to permit the withdrawal of said wire, and a spring-catch to hold the said guiding means in its operative position.

4. A seed planter embodying a main axle and a pair of ground-wheels therefor, a frame supported by said axle, a tongue carried by said frame, a seed feeding device adapted to deposit seed, a "check-wheel", a shaft for said "check-wheel", means connecting said shaft with the said feeding device whereby the latter is operated in unison with the partial rotations of said "check-wheel", a transverse bar secured to the said tongue, a supporting bar extending from the end of said transverse bar rearwardly and provided with a looped portion to receive the end of said main axle, a pair of inverted U-shaped members mounted on said supporting bars in the front and rear of said "check-wheel", a rotatable shaft extending through the U-shaped members and having the ends outside of the said U-shaped member bent at approximately right angles to the main portion thereof, rollers on said bent portions, a frame mounted on said shaft, a roller mounted in said frame and arranged at right angles in the rollers on the bent portions of said shaft, said shaft arranged to be swung into position to support and guide a "check-wire" to said "check-wheel", and a spring catch for holding said guiding means in its operative position.

In testimony whereof I have hereunto set my hand in presence of two subscribing witnesses.

EMMANUELL H. SNYDER.

Witnesses:
A. L. McClintock,
C. E. Humphrey.

Copies of this patent may be obtained for five cents each, by addressing the "Commissioner of Patents, Washington, D. C."